Dec. 22, 1925.  
N. MAILLETTE  
DIRECTION SIGNAL  
Filed April 17, 1924  
1,566,905  
2 Sheets-Sheet 1
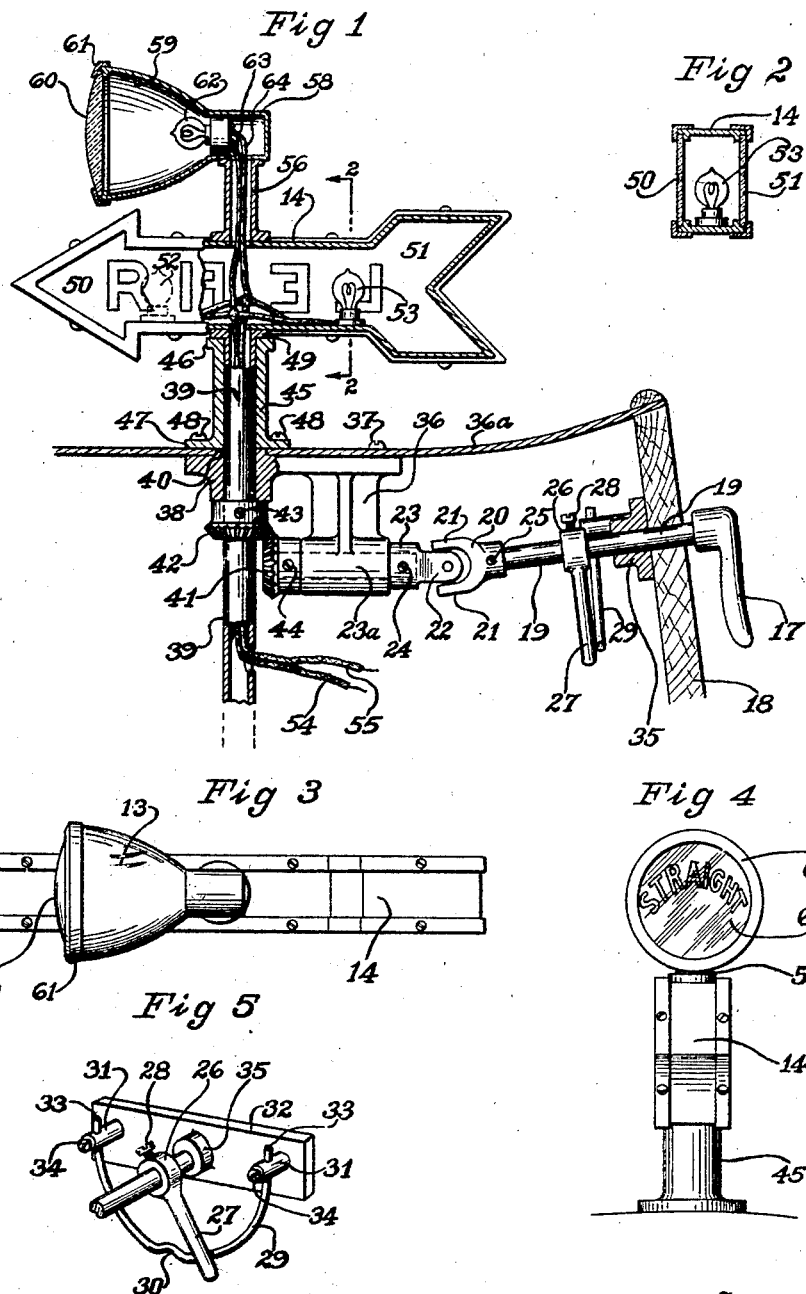
Inventor  
Napoleon Maillette  
By Attorney H. G. Manning

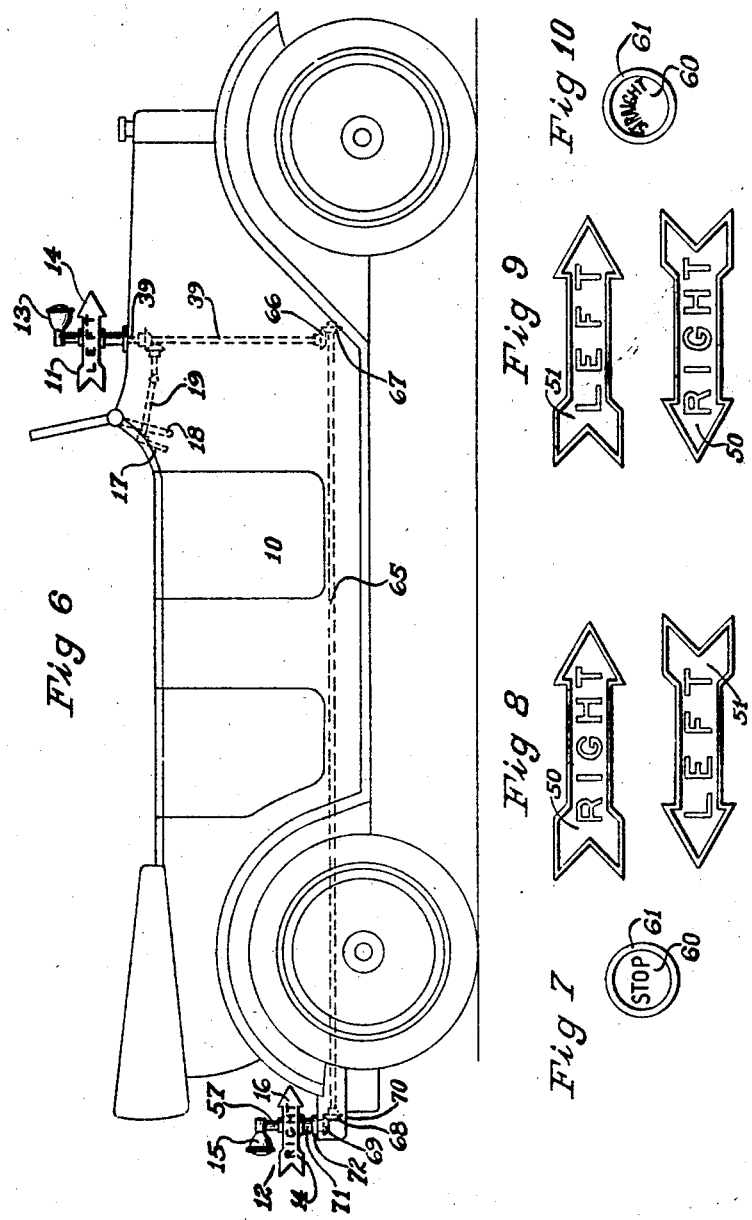

Patented Dec. 22, 1925.

1,566,905

UNITED STATES PATENT OFFICE.

NAPOLÉON MAILLETTE, OF WATERBURY, CONNECTICUT.

DIRECTION SIGNAL.

Application filed April 17, 1924. Serial No. 707,245.

*To all whom it may concern:*

Be it known that I, NAPOLÉON MAILLETTE, a citizen of Canada, and a resident of Waterbury, county of New Haven, and State of Connecticut, have invented certain new and useful Improvements in Direction Signals, of which the following is a specification.

This invention relates to signal devices for vehicles, and more particularly to a direction indicator adapted to be operated manually by the driver of a vehicle to visibly inform pedestrians, traffic officers, drivers of other vehicles, etc., whether he intends to proceed to the left, to the right, straight ahead, or to stop.

One object of this invention is to provide a direction indicator of the above nature which is capable of being used as an attachment on existing vehicles as well as to be installed in new cars.

A further object is to provide a device of the above nature which will be simple, inexpensive to manufacture, easy to install, easy to manipulate, and very efficient and durable in use.

With these and other objects in view, there has been illustrated in the accompanying drawings one form in which the invention may be conveniently embodied in practice.

Fig. 1 represents a side view of the direction indicator shown partly in section, and showing the interior operating mechanism.

Fig. 2 is a sectional view taken along the line 2—2 of Fig. 1 looking in the direction of the arrows.

Fig. 3 is a top view of the direction indicator.

Fig. 4 is a front view of the same.

Fig. 5 is a perspective view of the guiding member for limiting the rotation of the signal member.

Fig. 6 is a side view of an automobile upon which a pair of direction indicators have been installed, one at the front and one at the rear thereof.

Fig. 7 is a rear view of the stop signal employed on the rear signal device.

Figs. 8 and 9 are views showing both sides of the direction signal members located at the front and rear of the car.

Fig. 10 is a front view of the spot light used on the front signal device.

Referring now to the drawings in which like reference numerals denote corresponding parts throughout the several views, the numeral 10 indicates an automobile, having mounted thereon a pair of front and rear signal devices generally denoted by numerals 11 and 12 respectively.

The front signal device is provided with an upper lamp 13 comprising a spot light and having printed thereon the word "Straight" to indicate that the driver intends to proceed straight ahead. The spot light 13 is rigidly mounted upon a signal member 14 formed in the shape of an arrow, and having transparent sides 50 and 51 bearing the inscription "Left" and "Right."

The rear signal device is identical with that at the front, with the exception of the position of the upper lamp, which in this case comprises a "stop" signal, faces to the rear instead of to the front, and bears the inscription "Stop" instead of "Straight."

Both of the signal devices at the front and rear of the car are operated by a single handle 17 located behind the dash board 18 within convenient reach of the driver. The handle 17 is mounted on the end of a slightly inclined shaft 19 extending forwardly and downwardly through the dash board and having a collar 20 at its forward end. The collar 20 comprises one-half of a universal joint, and is provided with a pair of U-shaped arms 21 adapted to be pivotally connected to a similar pair of arms 22 on a collar 23 comprising the other half of the universal joint. The collars 20 and 23 are connected to the inclined shaft 19 and a horizontal shaft 23ª respectively by means of screws 24 and 25 respectively.

In order to limit the motion of the signal device to ninety degrees in both directions, a cylindrical collar 26 having an integral rod 27 projecting therefrom is fitted upon said shaft, said collar being detachably secured to said shaft in any desired adjusted position as by a screw bolt 28. As most clearly shown in Fig. 1, the rod 27 is adapted to engage a substantially circular spring member 29, preferably constructed from resilient spring wire, and having its central portion bent rearwardly to form a groove 30.

The groove 30 in the circular spring member 29 serves to hold the rod 27 in central position when the signal is set for "straight" ahead. The rotation of the rod 27 is limited by a pair of posts 31 mounted in a plate 32, said posts 31 being adapted to detachably receive the ends 33 of the spring member 29, said ends 33 being tightly gripped by suitable screws 34. The plate 32 is also provided with a projecting central neck portion 35 which forms a bearing for the shaft 19.

The forward horizontal shaft 23ª is mounted in a horizontal bearing of an L-shaped bracket 36 adapted to be secured to the under side of the automobile hood in any suitable manner, as by means of screws 37. The L-shaped bracket 36 is provided with a vertical bearing 38 at its forward end for supporting a vertical tubular shaft 39, and above said bearing 38 the bracket 36 has a shoulder 40 fitted in an aperture in the hood to assist in holding it in position.

In order to communicate the motion of the handle 17 to the signal devices 11 and 12 located above the hood and at the rear of the car, the shafts 23ª and 39 are provided with intermeshing bevel gears 41 and 42 respectively, said gears being locked in position by suitable screws 43 and 44.

The tubular shaft 39 extends upwardly through the hood 26ª and above said hood it is surrounded by a bushing 45. The bushing 45 has its upper and lower ends flanged at 46 and 47. The lower flange 47 is secured in position upon the hood by screws 48, while the upper flange 46 forms a seat for a collar 49 on the top of the tubular shaft 39. The collar 49 in turn forms a seat for the hollow signal member 11 at the front of the car.

Each of the signal members 11 and 12 comprises a box and is preferably formed from strips of thin sheet metal bent into the shape of an arrow and riveted together at their edges, said box having transparent sides 50 and 51. The transparent sides are provided with inscriptions "Right" and "Left" respectively, and are illuminated on the inside by a pair of incandescent lamps 52 and 53. The lamps 52 and 53 are adapted to receive current from a pair of insulated conducting wires 54 and 55, said wires passing downwardly through the tubular shaft 39 and being connected to the terminals of a storage battery or to any other suitable source of current. The "spot lamp" 13 and the "stop lamp" 15 previously mentioned, are secured in position by vertical hollow posts 56 and 57 having flanged ends secured to the casings of said lamps and said signal members respectively. The lamp casings are preferably provided with reduced cylindrical end sections 58 and concave reflecting sections 59, lenses 60 being held in place by bezels 61 at the outer ends of said reflecting sections. The lens of the rear stop lamp is preferably of red glass and has the word "Stop" printed thereon, while the lens of the front spot lamp is colorless and has the word "Straight" printed thereon. The upper lamps 13 and 15 are illuminated by electric bulbs 62, said bulbs being secured in the cylindrical sections 58 of the lamp casings in any suitable manner, and being connected to the wires 54 and 55 by insulated wires 63 and 64 respectively.

Any suitable means, not shown, may be provided to cause the bulb 62 of the rear "stop" lamp to light when the brakes are applied to slow down the car, or to stop.

In order to operate the rear signal device 12 with the front signal member, the tubular shaft 39 on the front signal member is extended downwardly to a point near the base frame of the car where it is connected to a horizontal shaft 65 by means of a pair of intermeshing bevel gears 66 and 67 mounted on said shafts 39 and 65 respectively. The rear end of the horizontal shaft 65 is similarly connected by means of intermeshing bevel gears 68 and 69 located in a hollow casing 70 to a tubular shaft 71 of the rear signal member. The shaft 71 is surrounded by a double-flanged bushing 72 for supporting the rear signal device, said bushing 72 being similar to the bushing 45 previously described.

In operation, assuming the handle 17 to be located in its middle position with the rod 27 in the groove 30, if the driver desires to go to the right, he will give the handle 17 a quarter turn in a counter-clockwise direction as far as it will go. Should the driver then desire to go to the left, he will rotate the handle 17 in a clockwise direction as far as it will go. When the driver desires to go straight ahead, he will move the handle 17 to its central vertical position, until the rod 27 snaps into the groove 30 on the spring member 29. The signal devices will then be positively held in their normal positions without further attention on the part of the driver.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention what is claimed as new, and for which it is desired to secure Letters Patent is:

1. In a direction indicator for a motor vehicle, a signal member, means for operating said member comprising a horizontal shaft located under the vehicle hood, an inclined shaft connected with said horizontal shaft by a universal joint, a handle on the end of said inclined shaft located in position to be operated by the driver, a wire formed into a semi-circular resilient member, a depending rod on said inclined shaft, said wire being adapted to resiliently press against said rod, said wire having a central recess to hold the rod in central position, and a pair of stops at the end of said wire for limiting the extreme rotation of said rod.

2. In a direction indicator for a motor vehicle, a signal member, means for operating said member including a shaft located under the vehicle hood, a handle on the end of the shaft located in position to be operated by the driver, said shaft having means located under said hood for holding said signal in various display positions.

In testimony whereof, I have affixed my signature to this specification.

NAPOLÉON MAILLETTE.